United States Patent [19]

Yoshitake et al.

[11] Patent Number: 5,581,774
[45] Date of Patent: Dec. 3, 1996

[54] DATA PROCESSOR DECODING AND EXECUTING A TRAIN OF INSTRUCTIONS OF VARIABLE LENGTH AT INCREASED SPEED

[75] Inventors: Akihiro Yoshitake; Toshiharu Ohshima, both of Kawasaki, Japan

[73] Assignee: Fujitsu Limited, Kawasaki, Japan

[21] Appl. No.: 213,822

[22] Filed: Mar. 14, 1994

Related U.S. Application Data

[63] Continuation of Ser. No. 578,756, Sep. 7, 1990, abandoned.

[30] Foreign Application Priority Data

Sep. 8, 1989 [JP] Japan ..................... 1-231705

[51] Int. Cl.$^6$ .................................................. G06F 9/30
[52] U.S. Cl. .................. 395/386; 395/383; 395/389; 395/800; 364/232.8; 364/261.1; 364/262.81; 364/DIG. 1
[58] Field of Search .................... 395/800, 775, 395/650, 425, 375, 421.02, 421.09, 496; 364/130–134

[56] References Cited

U.S. PATENT DOCUMENTS

| | | | |
|---|---|---|---|
| 4,135,242 | 1/1979 | Ward et al. | 395/775 |
| 4,236,206 | 11/1980 | Strecker et al. | 395/375 |
| 4,415,969 | 1/1983 | Bayliss et al. | 395/375 |
| 4,454,578 | 6/1984 | Matsumoto et al. | 395/375 |
| 4,580,214 | 4/1986 | Kubo et al. | 395/425 |
| 4,667,305 | 5/1987 | Dill et al. | 395/325 |
| 4,907,194 | 3/1990 | Yamada et al. | 395/425 |
| 4,914,675 | 4/1990 | Fedele | 375/25 |
| 5,032,838 | 7/1991 | Murayama et al. | 341/67 |
| 5,113,515 | 5/1992 | Fite et al. | 395/425 |
| 5,202,967 | 4/1993 | Matsuzaki et al. | 395/375 |

FOREIGN PATENT DOCUMENTS

| | | |
|---|---|---|
| 0352103 | 1/1990 | European Pat. Off. . |
| 0380854 | 8/1990 | European Pat. Off. . |

OTHER PUBLICATIONS

Lampson et al., "An Instruction Fetch Unit for a High–Performance Personal Computer", IEEE Transactions On Computers, vol. C–33, No. 8, Aug. 1984, New York, US, pp. 713–730.

Primary Examiner—Alpesh M. Shah
Attorney, Agent, or Firm—Staas & Halsey

[57] ABSTRACT

A data processor decoding and executing a train of instructions of variable length. The data processor includes a first instruction control means for temporarily storing a prefetched instruction code and sequentially outputting said instruction code with units of a predetermined number of bits, and a second instruction control means for decoding an instruction code fed from the first instruction control means, generating control information for data processing based on the decoding, and outputting data indicating instruction update demand quantity to the first instruction control means. Based on the data indicating the update demand quantity, the first instruction control means judges whether it has output a valid instruction code of length exceeding the update demand quantity, and provides an indication of validity or invalidity of the decoded instruction code and controls updating of the instruction code based on a result of the judgement. As a result, it becomes possible to reduce time necessary for the supply of instruction codes and thus improve a data processing speed as the entire processor.

5 Claims, 8 Drawing Sheets

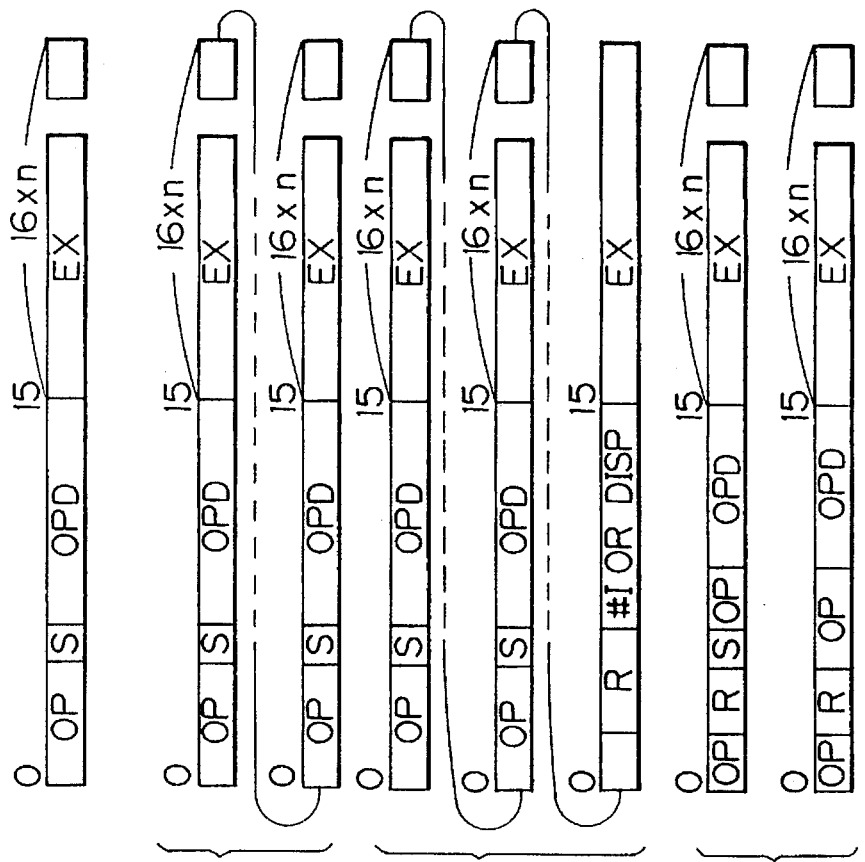
Fig.8a (ONE OPERAND)
Fig.8b (TWO OPERANDS)
Fig.8c (EXTENDED OPERAND)
Fig.8d (MEMORY-REG.)
Fig.8e (REG.-REG.)

DATA PROCESSOR DECODING AND EXECUTING A TRAIN OF INSTRUCTIONS OF VARIABLE LENGTH AT INCREASED SPEED

This application is a continuation of application No. 07/578,756, filed Sep. 7, 1990, now abandoned.

BACKGROUND OF THE INVENTION

1. Field of the Invention

The present invention relates to a data processor, more particularly, to a microprocessor which decodes and executes a train of instructions of variable length.

2. Description of the Related Art

A typical microprocessor includes an instruction buffer for storing prefetched instruction codes, and a decoder which receives a train of instructions of variable length fed from the instruction buffer and decodes them to produce control information for data processing (e.g., control information on pipeline control, microprogram addresses, or the like). To decode and execute the train of instructions of variable length, the decoder must receive valid data, i.e., valid instruction codes. To this end, the instruction buffer in the conventional processor predecodes the train of instructions, thereby always to supply the decoder with valid data. At this time, the instruction buffer determines an update quantity of the instruction to be next decoded by the decoder.

However, where the instruction buffer must predecode many bits from among the instruction codes to determine the update quantity of the instructions, the predecoding requires as long a time as that necessary for the decoding of instructions by the decoder. Accordingly, a drawback occurs in that the instruction buffer cannot quickly feed valid instruction codes to the decoder. This leads to a lowering in the data processing speed of the entire processor and thus is not preferable.

SUMMARY OF THE INVENTION

An object of the present invention is to provide a data processor which can increase its data processing speed as a whole.

According to the present invention, there is provided a data processor for decoding and executing a train of instructions of variable length, the data processor including: a first instruction control unit for temporarily storing a prefetched instruction code and sequentially outputting the instruction code with units of a predetermined number of bits; and a second instruction control unit, operatively connected to the first instruction control unit, for decoding an instruction code fed from the first instruction control unit, generating control information for data processing based on the decoding, and outputting data indicating an instruction update demand quantity to the first instruction control unit, wherein the first instruction control unit effects a judgement, based on the data indicating the update demand quantity, of whether it has output a valid instruction cede of a length exceeding the update demand quantity, and provides an indication of validity or invalidity of the decoded instruction code and controls updating of the instruction code based on a result of the judgement.

BRIEF DESCRIPTION OF THE DRAWINGS

Other objects and features of the present invention will be described hereinafter in detail by way of preferred embodiments with reference to the accompanying drawings, in which:

FIGS. 8a to 8e are views illustrating instruction formats employed in the embodiment of FIG. 2.

DESCRIPTION OF THE PREFERRED EMBODIMENTS

Figure 1:
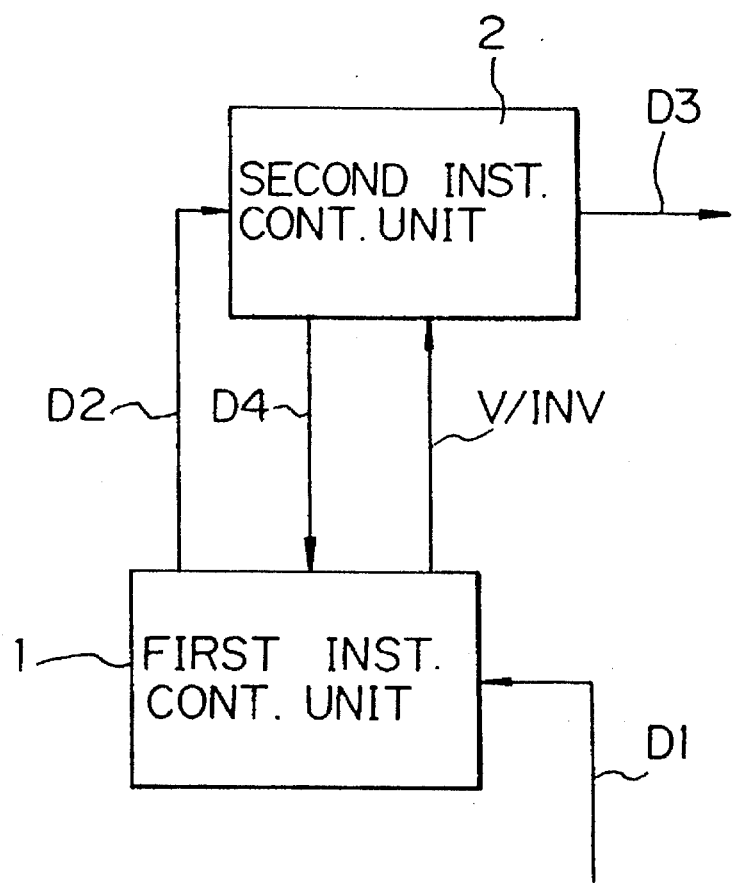
FIG. 1 is a block diagram illustrating a principle of a data processor according to the present invention.

FIG. 1 illustrates the principle of the data processor according to the present invention.

Referring to FIG. 1, the data processor according to the present invention, which decodes and executes a train of instructions of variable length, includes a first instruction control unit 1 for temporarily storing a prefetched instruction code D1 and sequentially outputting the instruction code in units of a predetermined number of bits, and a second instruction control unit 2 for decoding an instruction code D2 fed from the first instruction control unit, generating control information D3 for data processing based on the decoding, and outputting data D4 indicating instruction update demand quantity to the first instruction control unit 1.

Where the first instruction control unit judges, based on the data D4 indicating the update demand quantity, that it has output a valid instruction code 2 of a length exceeding the update demand quantity, it provides an indication (V) that the decoded instruction code is valid, and updates instruction codes. On the other hand, where the first instruction control unit judges that it has not output a valid instruction code of a length exceeding the update demand quantity, it provides an indication (INV) that the decoded instruction code is invalid, and causes the second instruction control unit to effect the decoding again on the identical stage.

In the above arrangement, the first instruction control unit 1 outputs an instruction code irrespective of whether the instruction code is valid or invalid. The second instruction control unit 2 in turn assumes that the instruction code D2 fed from the first instruction control unit 1 is valid, and outputs the update demand quantity D4. Based on the update demand quantity D4, the first instruction control unit 1 judge the validity or the invalidity of the decoding and controls updating of the instruction code.

Therefore, it becomes unnecessary to effect predecoding for determination of the update quantity, as performed in the prior art, and thus it becomes possible to reduce time necessary for the supply of instruction codes. This contributes to an improvement in data processing speed of the entire processor.

Next, a preferred embodiment of the present invention will be explained with reference to FIGS. 2 to 8e.

Figure 2:
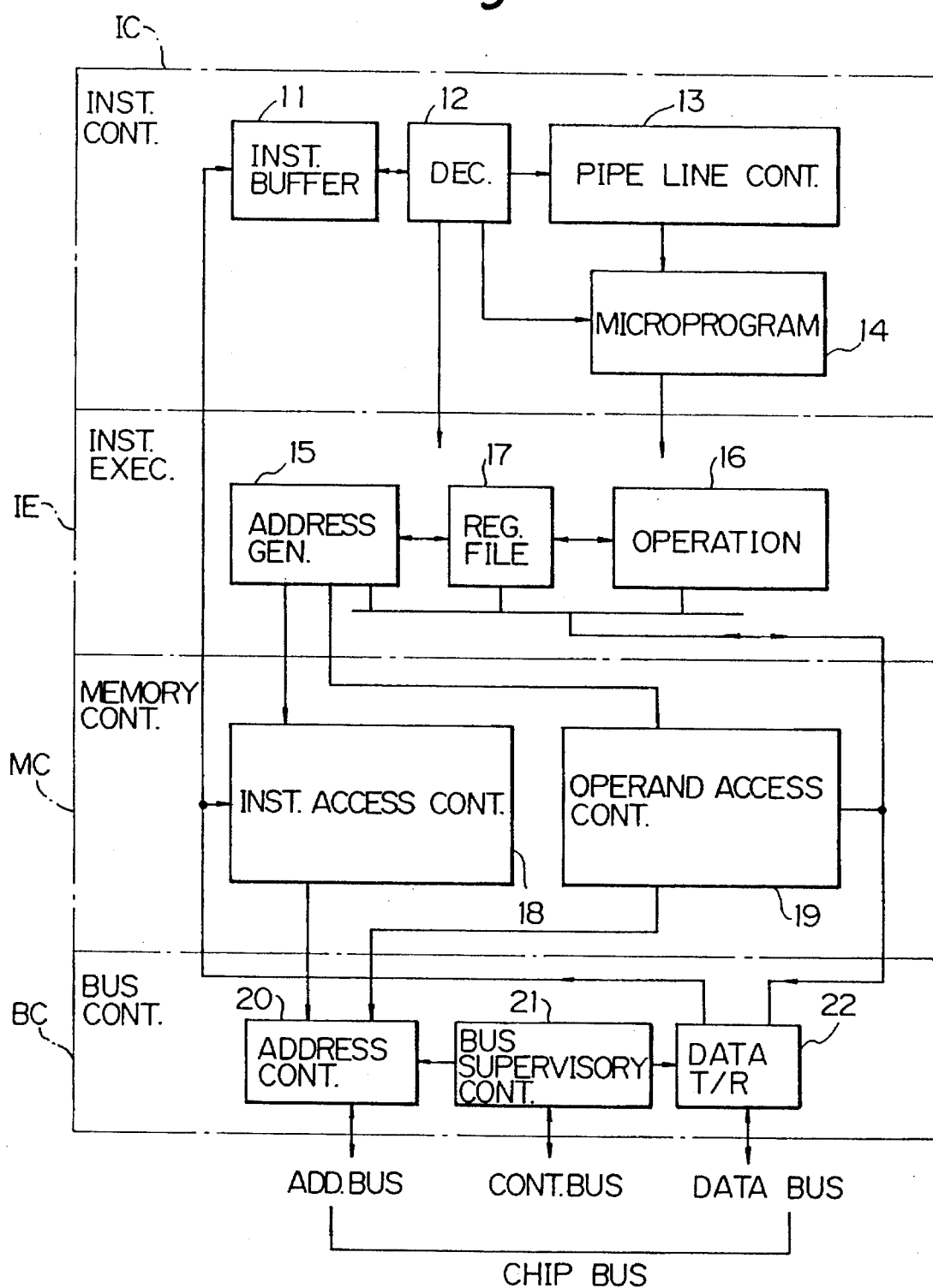
FIG. 2 is a functional block diagram illustrating an entire arrangement of the microprocessor according to an embodiment of the present invention.

FIG. 2 illustrates an entire structure of the microprocessor as an embodiment of the present invention.

The microprocessor according to the present embodiment includes an instruction control unit IC having an instruction buffer 11, a decoder 12, a pipeline controller 13, and a microprogram 14; an instruction execution unit IE having an address generator 15, an operation unit 16, and a register file 17; a memory control unit MC having an instruction access controller 18 and an operand access controller 19; and a bus control unit BC having an address controller 20, a bus supervisory controller 21, and a data transmitting and receiving unit 22. The instruction control unit IC reads, decodes, and executes instructions. The structure and operations of the instruction execution unit IE, the memory control unit MC and the bus control unit BC are not directly related to the present invention and thus the explanation thereof is omitted.

Next, the structure of the instruction buffer 11 and decoder 12 in the instruction control unit IC will be explained with reference to FIGS. 3 and 4, respectively. Note, the instruction buffer 11 and decoder 12 correspond to the first instruction control unit 1 and second instruction control unit 2 shown in FIG. 1, respectively.

Figure 3:
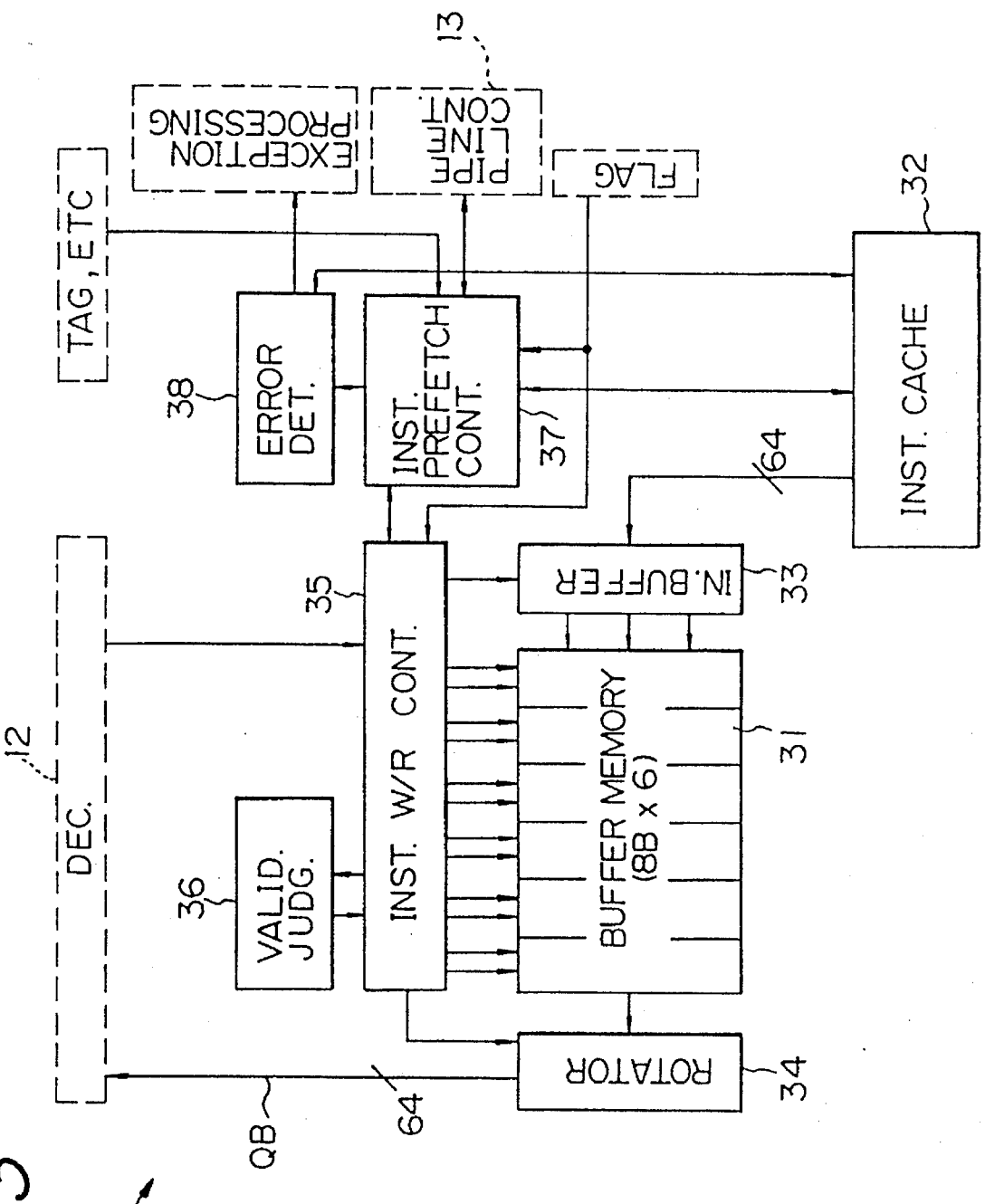
FIG. 3 is a block diagram illustrating a constitution of the instruction buffer shown in FIG. 2.

Referring to FIG. 3, the instruction buffer 11 includes a buffer memory 31 of 8 bytes (B)×6 in capacity; an input buffer 33 interposed between an instruction cache 32 of the instruction access controller 18 and the buffer memory 31; a rotator 34 for rotating bits to bring a first bit of an instruction code, read out of the buffer memory 31, to a first bit of an iQ bus QB; an instruction write/read controller 35 for controlling write/read operations of instructions (codes) for the buffer memory 31; a validity judging unit 36 for judging the validity of a decoded instruction; an instruction prefetch controller 37 for controlling fetching of an instruction code from the instruction cache 32; and an error detector 38 for selecting an exception processing based on an output of the instruction prefetch controller 37.

The instruction buffer 11 prefetches instruction codes from the instruction cache 32 into the buffer memory 31 until the buffer memory 31 becomes full of instruction codes. The fetched codes are sequentially read out in units of 16 bits via the iQ bus QB to the decoder 12. When the decoding of each 16-bit unit is completed, the buffer memory 31 becomes "empty" and in turn a new prefetch operation is carried out. In the read operation from the buffer memory 31, the rotator 34 rotates an instruction code, read out of the buffer memory 31 in units of 16 bits, thereby bringing a first bit of an instruction code to be next decoded to a first bit position of the iQ bus QB.

The instruction code, of 16-bit units fed to the decoder 12 from the instruction buffer 11 via the iQ bus QB constitutes part of a train of instructions of variable length having formats, for example, as shown FIGS. 8a to 8e. Note, in FIGS. 8a to 8e, reference OPD denotes an operand designating part; reference EX an extended part; reference OP an instruction code part; reference R a register designating part; reference S an operand size designating part; reference #I an immediate value; and reference DISP a displacement part.

Figure 4:
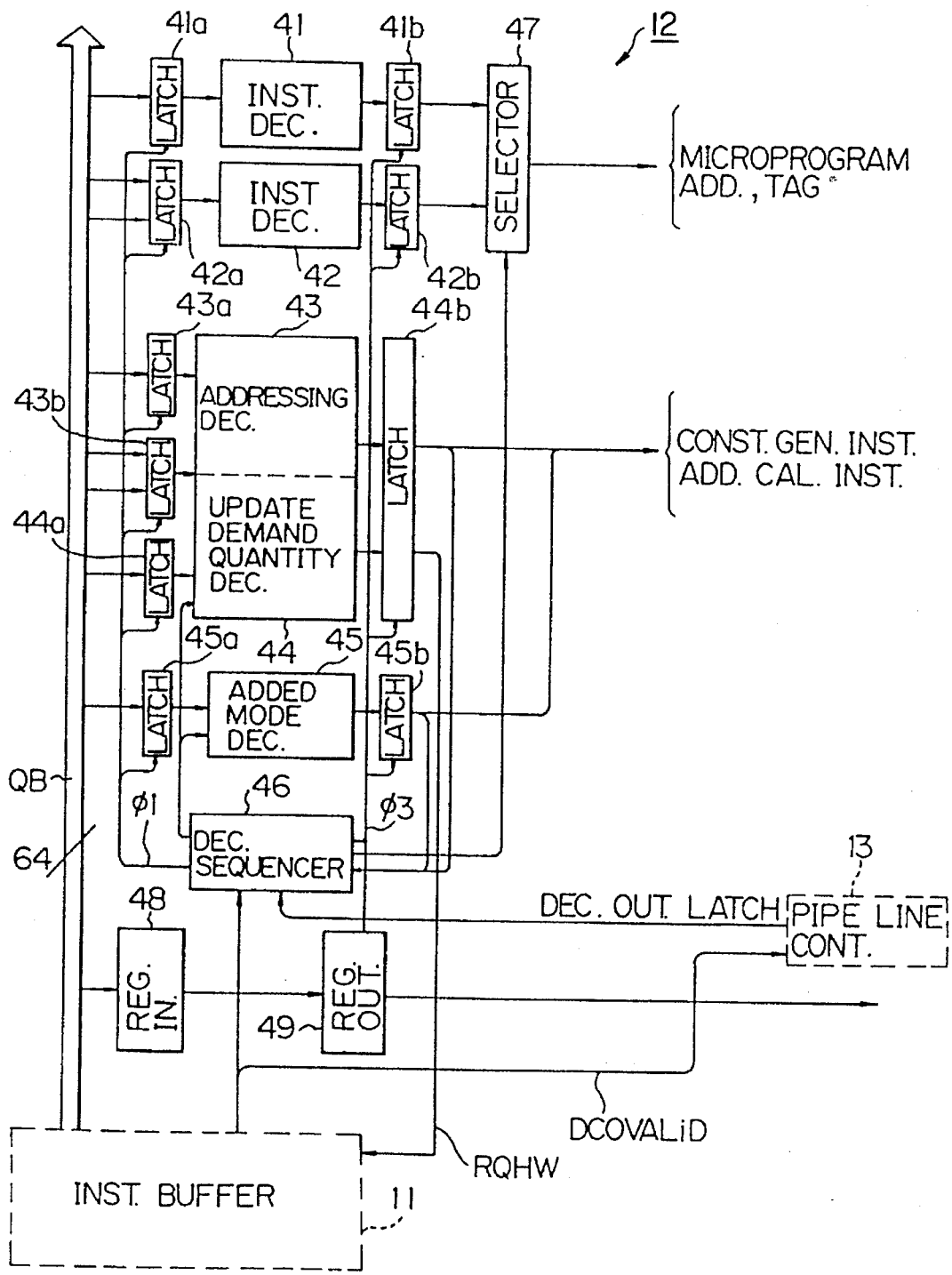
FIG. 4 is a block diagram illustrating a constitution of the decoder shown in FIG. 2.

Next, referring to FIG. 4, the decoder 12 includes a first instruction decoding unit 41; a second instruction decoding unit 42; an addressing decoding unit 43; an update demand quantity decoding unit 44 for computing an update demand quantity of instruction codes; an added mode decoding unit 45; a decoding sequencer 46 for forming a current decoding stage of instruction codes and sequentially selecting outputs of each of the decoding units according to the decoding stage; a selector 47 for selecting one of the outputs of the first and second instruction decoding units 41 and 42 under the control of the decoding sequencer 46; a register input unit 48 for receiving data from the iQ bus QB; a register output unit 49 for passing an output of the register input unit 48 in response to an internal clock $\phi 3$ fed from the decoding sequencer 46; latches 41a, 42a, 43a, 43b, 44a, and 45a disposed at the input sides of the respective correspondingly numbered decoding units and responsive to an internal clock $\phi 1$ fed from the decoding sequencer 46; and latches 41b, 42b, 44b, and 45b disposed at the output sides of the respective, correspondingly numbered decoding units 41, 42, 43, 44 and 45 and responsive to the internal clock $\phi 3$.

The decoder 12 receives a train of instructions of variable length (see FIGS. 8a to 8e) fed through the iQ bus QB, and decodes them on the basis of the 16-bit base length. Concretely, the decoder 12 decodes the type and addressing mode, or the like, of a supplied instruction, and generates control information such as pipeline control information, operand address computing information and microprogram addresses that are used for data processing. At the same time, the decoder 12 outputs data RQHW indicating update demand quantity of instruction codes to the instruction buffer 11.

Based on the update demand quantity data RQHW, the instruction buffer 11 effects a validity/invalidity judgement (DCOVALiD) of the decoding and controls updating of instruction codes.

Figure 5:
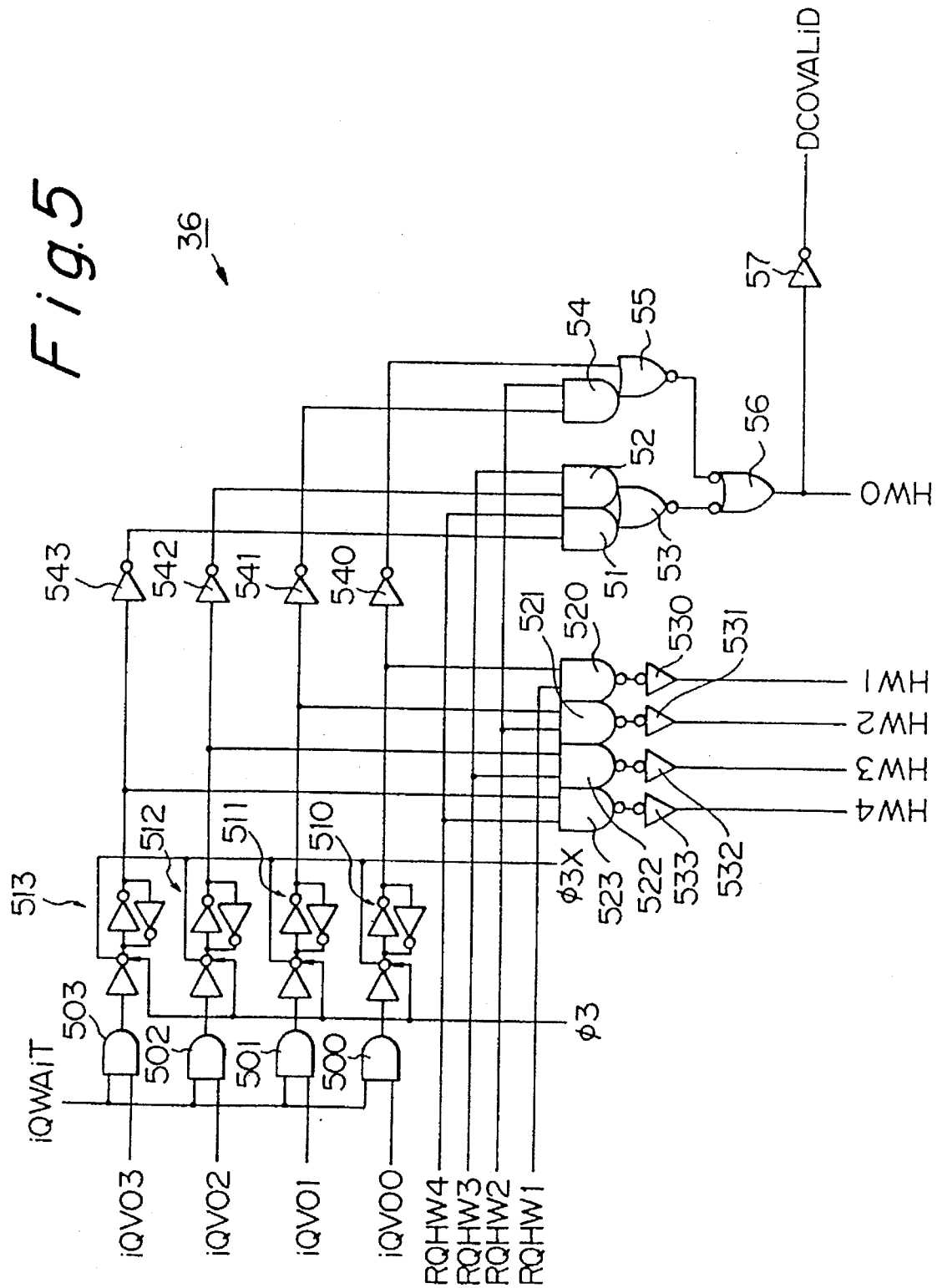
FIG. 5 is a circuit diagram illustrating a constitution of the main part of the instruction buffer of FIG. 3.

FIG. 5 illustrates a structure of a main part of the instruction buffer 11, i.e., the validity judging unit 36.

In the illustration, references iQVO3 to iQVO0 denote signals indicating how many half-words (HWs) counted from an upper bit are valid among 64-bit data (63 to 0) output to the iQ bus. For example, where the upper two half-words (bits 63 to 32) are valid, the signals iQVO0 and iQVO1 are at level "H", and the signals iQVO2 and iQVO3 are at level "L". References RQHW4 to RQHW1 denote update demand quantity indication signals (instruction code demand signals) mentioned above. For example, when the decoder 12 demands two half-words to be updated, only the signal RQHW2 is at level "H", and the other signals are at level "L". Reference iQWAiT denotes a wait demand signal; references HW0 to HW4 denote signals indicating update quantity of instruction codes that must be updated by the decoding; and reference DC0VALiD denotes a signal indicating the validity or invalidity of the decoding.

The circuit of FIG. 5 includes AND gates 500 to 503 responding to the wait demand signal iQWAiT and the signals iQVO0 to iQVO3; latch circuits 510 to 513 responding to a signal $\phi 3$ (an inverted signal $\phi 3X$) to latch outputs of the AND gates 500 to 503; NAND gates 520 to 523 responding to output signals of the latch circuits 510 to 513 and instruction code demand signals RQHW1 to RQHW4; inverters 530 to 533 of input inverting type responding to outputs of the NAND gates 520 to 523 and providing the signals HW1 TO HW4; inverters 540 to 543 responding to outputs of the latch circuits 510 to 513; an AND gate 51 responding to an output of the inverter 543 and the instruction code demand signal RQHW4; an AND gate 52 responding to an output of the inverter 542 and the instruction code demand signal RQHW3; a NOR gate 53 responding to outputs of the AND gates 51 and 52; an AND gate 54 responding to an output of the inverter 541 and the instruction code demand signal RQHW2; a NOR gate 55 responding to an output of the AND gate 54 and an output of the inverter 540; an OR gate 56 of input inverting type responding to outputs of the NOR gates 53 and 55 to provide the signal HW0; and an inverter 57 responding to an output of the OR gate 56 to provide the signal DCOVALiD for judging the validity of decoded instruction codes.

As explained above, the instruction buffer 11 produces the information iQVO3 to iQVO0 indicating how many HWs, counted from the upper bit, are valid among data output to the iQ bus QB, based on valid bits of the respective buffer. Based on the produced information and the instruction code demand signals RQHW4 to RQHW1 fed from the decoder 12, the validity judging unit 36 in the instruction buffer 11 judges whether or not instruction codes must be updated. Concretely, where the instruction buffer 11 has output a valid instruction code of a length exceeding the update demand quantity, the instruction buffer 11 provides a validity judging signal DCOVALiD of "H" level, indicating that the decoded instruction code is valid, and effects updating of instruction codes. On the other hand, where the instruction buffer 11 has not output a valid instruction code of length exceeding the update demand quantity, it provides a validity judging signal DCOVALiD of "L" level indicating that the decoded instruction code is invalid. In this case, the decoder 12 effects the decoding again on the identical stage.

Figure 6:
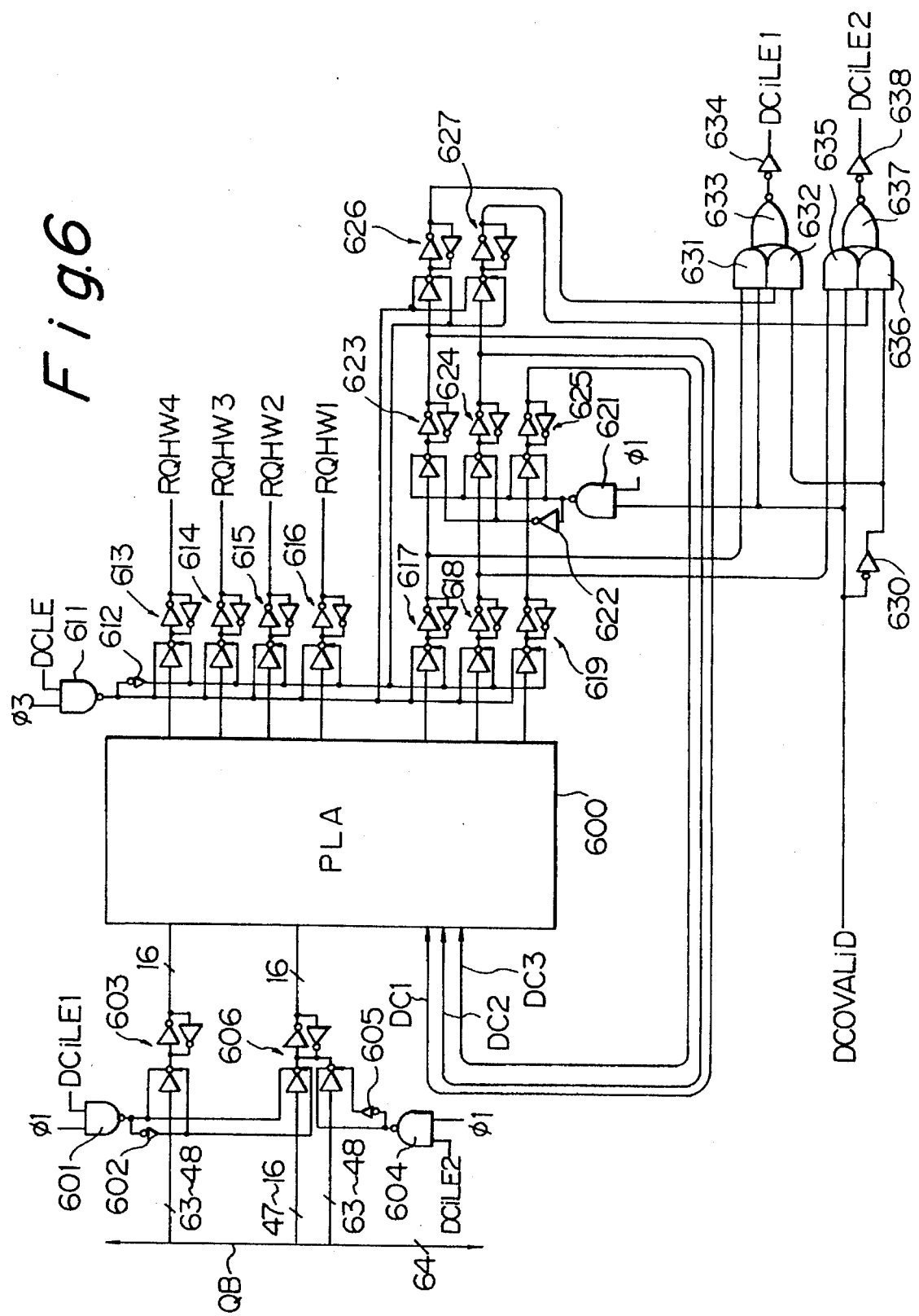
FIG. 6 is a circuit diagram illustrating a constitution of the main part of the decoder of FIG. 4.

FIG. 6 illustrates a structure of a main part of the decoder 12 of FIG. 4. The illustration corresponds to the update demand quantity decoding unit 44, part of the decoding sequencer 46, and latches provided in the periphery thereof.

The circuit of FIG. 6 includes a programmable logic array (PLA) 600; a NAND gate 601 responding to a signal φ 1 and a decoding input latch enable signal DCiLE1; an inverter 602 of input inverting type responding to an output of the NAND gate 601; a latch circuit 603 for latching an instruction code from the iQ bus QB in response to the control signal φ 1 (an inverted signal φ 1X) and supplying the same to the PLA 600; a NAND gate 604 responding to the signal φ 1 and a decoding input latch enable signal DCiLE2; an inverter 605 of input inverting type responding to an output of the NAND gate 604; a latch circuit 606 for latching an instruction code from the iQ bus QB in response to the control signal φ 1 (inverted signal φ 1X) and supplying the same to the PLA 600; a NAND gate 611 responding to a signal φ 3 and a decoding output latch enable signal DCLE; an inverter 612 of input inverting type responding to an output of the NAND gate 611; latch circuits 613 to 616 for latching data from the PLA 600 in response to the signal φ 3 (inverted signal φ 3X) and providing the instruction code demand signals RQHW4 to RQHW 1; latch circuits 617 to 619 for latching data from the PLA 600 in response to the signal φ 3 (inverted signal φ 3X); a NAND gate 621 responding to the signal φ 1 and the signal DCOVALiD indicating the validity of decoded instruction codes; an inverter 622 of input inverting type responding to an output of the NAND gate 621; latch circuits 623 to 625 for latching outputs of the latch circuits 617 to 619 in response to the signal φ 1 (inverted signal φ 1X) and providing decoding signals DC1 to DC3; latch circuits 626 and 627 for latching outputs of the latch circuits 623 and 624 in response to the control signal φ 3 (inverted signal φ 3X); an inverter 630 responding to the validity judging signal DCOVALiD; an AND gate 631 responding to an output of the latch circuit 617 and the validity judging signal DCOVALiD; an AND gate 632 responding to an output of the latch circuit 626 and an output of the inverter 630; a NOR gate 633 responding to outputs of the AND gates 631 and 632; an inverter 634 of input inverting type for generating a decoding latch enable signal DCiLE1 in response to an output of the NOR gate 633; an AND gate 635 responding to an output of the latch circuit 618 and the validity judging signal DCOVALiD; an AND gate 636 responding to an output of the latch circuit 627 and an output of the inverter 630; a NOR gate 637 responding to outputs of the AND gates 635 and 636; and an inverter 638 of input inverting type for generating a decoding latch enable signal DCiLE2 in response to an output of the NOR gate 637.

Figure 7:
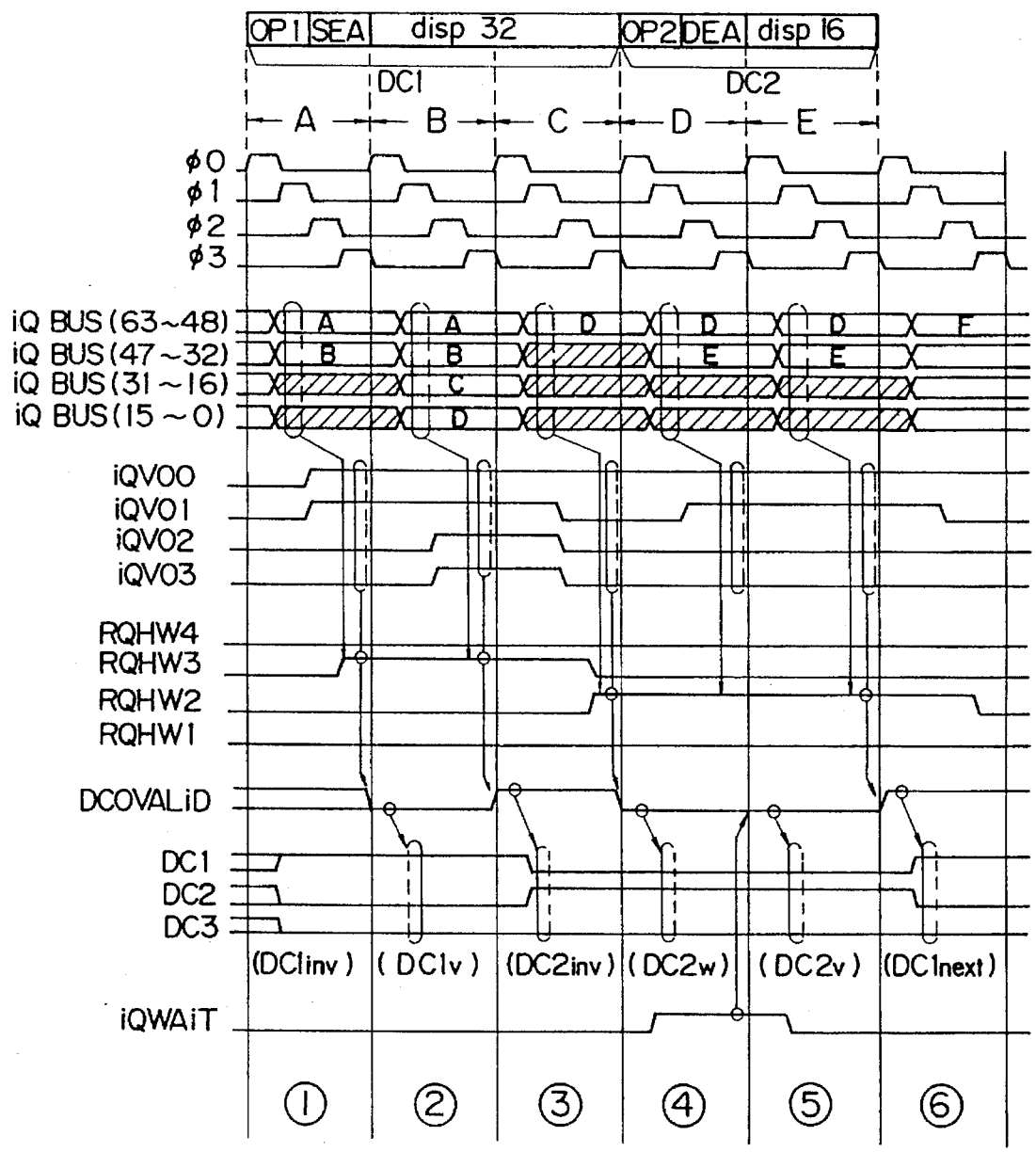
FIG. 7 is a timing chart illustrating an example of the operation of the embodiment of FIG. 2.

Next, the operation of the microprocessor according to the present embodiment will be explained with reference to the timing chart of FIG. 7, citing an example of a MOV (move) instruction.

(a) Cycle ①

The decoder 12 latches data (instruction codes) from the iQ bus QB in response to the control signal φ 1, and decodes the same through the PLA 600. In the example of FIG. 7, a result of the decoding indicates that three half-words each comprising 16 bits can simultaneously be decoded. The decoder 12 asserts, therefore, the instruction code demand signal RQHW3 to request updating of instruction codes of three half-words. On the other hand, the instruction buffer 11 produces the information iQVO3 to iQVO0 indicating how many HWs, counted from the upper bit, are valid among the data output to the iQ bus QB, based on valid bits of the respective buffer. According to the produced information and the instruction code demand signals RQHW4 to RQHW1 fed from the decoder 12, the validity judging unit 36 (see FIG. 5) in the instruction buffer 11 judges whether or not instruction codes must be updated.

In this case, since the instruction buffer 11 has not output a valid instruction code of a length exceeding the update demand quantity, it negates the validity judging signal DCOVALiD, asserts the instruction code HW0, and outputs the instruction code from the identical location of the buffer to the iQ bus QB in the next cycle ②.

Since the validity judging signal DCOVALiD has been negated, the decoder 12 recognizes (detects) that the decoded instruction code is invalid, by means of the circuit of FIG. 6, and effects the decoding again on the identical stage.

(b) Cycle ②

A decoding processing similar to that of Cycle ① is carried out. The instruction buffer 11 outputs instruction codes prefetched in the cycle ① to the iQ bus QB (bits 31 to 0). As a result, valid codes of four half-words are ready, and the validity judging signal DCOVALiD is asserted. The instruction buffer 11 updates instruction codes of three half-words and the decoder 12 in turn transits its operation to the next decoding stage DC2.

(c) Cycle ③

The decoder 12 provides an update demand quantity of two half-words. There is, however, valid data of only one half-word, so that the validity judging signal DCOVALiD is negated.

(d) Cycle ④

There are two valid half-words. However, a wait demand signal iQWAiT is provided under the pipeline control, so that the signals iQVO1 to iQVO3 are thereby to negate the validity judging signal DCOVALiD.

(e) Cycle ⑤

Since the wait demand signal iQWAiT is negated, the validity judging signal DCOVALiD is asserted. The instruction buffer 11 updates instruction codes of two half-words and the decoder 12 in turn transits its operation to the next decoding stage DC1 (Cycle ⑥).

As explained above, according to the present embodiment, the instruction buffer 11 sequentially feeds instruction codes in units of a predetermined number of bits to the decoder 12, irrespective of the validity or invalidity of the instruction codes. The decoder 12 in turn assumes that the instruction codes fed from the instruction buffer 11 are Valid, and outputs update demand quantity to the instruction buffer 11. Based on the update demand quantity, the instruction buffer 11 judges the validity or the invalidity of the decoding and controls updating of the instruction code. Accordingly, it becomes unnecessary to effect predecoding for the determination of update quantity as required in the prior art and thus it becomes possible to reduce the time necessary for the supply of instruction codes. This results in an improvement in the data processing speed of the entire processor.

Although the present invention has been disclosed and described by way of one embodiment, it is apparent to those skilled in the art that other embodiments and modifications of the present invention are possible without departing from the spirit or essential features thereof.

We claim:

1. A data processor decoding and executing a train of instructions of variable length, said data processor comprising:

first instruction control means for temporarily storing a prefetched, variable length instruction having an instruction code and sequentially outputting said instruction code in units of a predetermined number of bits;

second instruction control means, operatively connected to said first instruction control means, for receiving and decoding each instruction code output by said first instruction control means, for generating control information for data processing based on the decoded instruction code, and for outputting data indicating an instruction update, demand quantity to said first instruction control means said second instruction control means further comprising means for decoding addressing information and additional information included in each variable length instruction and control means for forming a current decoding stage of instruction codes and sequentially selecting outputs of said decoding means according to the current decoding stage, thereby to supply said first instruction control means with data indicating the instruction update demand quantity; and said first instruction control means, further, being responsive to the data output of the second instruction control means, indicating the update demand quantity, for effecting a judgement of whether said instruction code is a valid instruction code having a bit length exceeding the update demand quantity and for providing said second instruction control means with data indicating validity or invalidity of the decoded instruction code and controlling updating of the instruction code based on a result of the judgement, said first instruction control means, when judging that it has output a valid instruction code having a bit length exceeding the update demand quantity, providing an indication that said decoded instruction code is valid, and updating the instruction code and, when judging that it has not output a valid instruction code having a bit length exceeding the update demand quantity, providing an indication that the decoded instruction code is invalid, and causing said second instruction control means to repeat the decoding.

2. A data processor as set forth in claim 1, wherein said second instruction control means further comprises means, responsive to control clocks from said control means, for latching each information to be input to a computing means and decoding means and each information output from said computing means and decoding means.

3. A data processor as set forth in claim 2, wherein said computing means and decoding means are formed by a programmable logic array.

4. A data processor decoding and executing a train of instructions of variable length, said data processor comprising:

first instruction control means for temporarily storing a prefetched instruction code and for controlling an arrangement of the bits of the prefetched instruction code and for sequentially outputting said instruction code in units of a predetermined number of bits;

second instruction control means, operatively connected to said first instruction control means, for receiving and decoding said instruction code output from said first instruction control means, for generating control information for data processing based on the decoding of the received instruction code, and for outputting data, indicating an instruction update demand quantity, to said first instruction control means; and said first instruction control means, further, being responsive to the data output of the second instruction control means, indicating the update demand quantity, for affecting a judgement of whether said instruction code is a valid instruction code having a bit length exceeding the update demand quantity and for providing said second instruction control means with data indicating validity or invalidity of the decoded instruction code and controlling updating of the instruction code based on a result of the judgement, said first instruction control means, when judging that it has output a valid instruction code having a bit length exceeding the update demand quantity, providing an indication that said decoded instruction code is valid, and updating the instruction code and, when judging it that has not output a valid instruction code having a bit length exceeding the update demand quantity, providing an indication that the decoded instruction code is invalid, and causing said second instruction control means to repeat the decoding.

5. A data processor comprising:

execution means for executing data processing based on a variable length instruction with a basic unit of N bits, N being greater than or equal to one;

an instruction decoder for decoding the variable length instruction and generating a control signal for control of the execution means and an update demand quantity corresponding to a number of basic units decodable at one time;

a first instruction bus for transferring in parallel data of N.M bits, M being greater than or equal to two;

an instruction queue buffer for storing data prefetched via said first instruction bus therein as an effective number of said basic unit;

a rotator for rotating a bit position of the data of N.M bits read from said instruction queue buffer with units of N bits, so that a head bit of data to be fed to said instruction decoder is brought to the head of said variable length instruction to be decoded and outputting an N.M bit output;

a second instruction bus for feeding the N.M-bit output of said rotator to said instruction decoder; and control means for feeding data as said variable length instruction from said instruction queue buffer to said instruction decoder, irrespective of whether or not said instruction queue buffer possesses effective data, and in response to the update demand quantity from said instruction decoder and the effective number of the basic unit from said instruction queue buffer, controlling said instruction queue buffer and said rotator for updating the instruction to be fed to said instruction decoder when the effective number exceeds the update demand quantity, and informing said instruction decoder of an invalidation of the decoding when the effective number is less than the update demand quantity.

* * * * *

UNITED STATES PATENT AND TRADEMARK OFFICE
CERTIFICATE OF CORRECTION

PATENT NO. : 5,581,774
DATED : Dec. 3, 1996
INVENTOR(S) : YOSHITAKE et al.

It is certified that error appears in the above-indentified patent and that said Letters Patent is hereby corrected as shown below:

TITLE PAGE: [56] References Cited:

Under "U.S. PATENT DOCUMENTS", the third reference, change "1/1983" to --11/1983--.

Col. 1, line 58, change "cede" to --code--.

Col. 2, line 37, after "unit" delete "1";
line 38, after "unit" insert --1--;
line 40, change "code 2" to --code $[D_2]$--;
line 57, change "judge" to --judges--.

Col. 3, line 13, change "structure" to --structures--.

Col. 4, line 8, after "respective" insert --,--;
line 9, after "units" insert --41 to 45--.

Col. 6, line 58, after "are" insert --masked--.

Col. 7, line 4, change "Valid," to --valid,--;
line 34 (Claim 1, line 15), after "update" delete ",".

Col. 8, line 26 (Claim 4, line 20), change "affecting" to --effecting--;
line 37 (Claim 4, line 31), change "it that" to --that it--.

UNITED STATES PATENT AND TRADEMARK OFFICE
CERTIFICATE OF CORRECTION

PATENT NO. : 5,581,774
DATED : Dec. 3, 1996
INVENTOR(S) : YOSHITAKE et al.

It is certified that error appears in the above-indentified patent and that said Letters Patent is hereby corrected as shown below:

Col. 9, line 54 (Claim 5, line 11), change "N.M" to --N•M--;
line 58 (Claim 5, line 15), change "N.M" to --N•M--;
line 63 (Claim 5, line 20), change "N.M" to --N•M--;
line 64 (Claim 5, line 21), change "N.M" to --N•M--.

Signed and Sealed this

Eighth Day of July, 1997

Attest:

BRUCE LEHMAN

*Attesting Officer*     *Commissioner of Patents and Trademarks*